(12) United States Patent
Chee et al.

(10) Patent No.: US 6,276,625 B1
(45) Date of Patent: Aug. 21, 2001

(54) TETHER STORAGE SYSTEM

(76) Inventors: Winston C. Chee, 1645 Carol Sue Ave., Apt. 207; Thomas L. Sherlin, 781 Huckleberry La., both of Gretna, LA (US) 70056

( * ) Notice: Subject to any disclaimer, the term of this patent is extended or adjusted under 35 U.S.C. 154(b) by 0 days.

(21) Appl. No.: 09/365,383

(22) Filed: Aug. 2, 1999

(51) Int. Cl.[7] ............................... B21C 47/00; B63G 8/00
(52) U.S. Cl. ....................... 242/360; 242/361.2; 242/362; 242/386; 114/312
(58) Field of Search .................................... 242/360, 386, 242/387, 128, 361.2, 361, 362; 114/312

(56) References Cited

U.S. PATENT DOCUMENTS

| | | | |
|---|---|---|---|
| 2,936,509 | * 5/1960 | Martin | 242/362 X |
| 3,566,654 | * 3/1971 | Adams et al. | 242/362 X |
| 3,715,068 | 2/1973 | Clarke et al. . | |
| 3,776,519 | * 12/1973 | Hamilton | 242/362 X |
| 4,222,535 | * 9/1980 | Hosbein | 242/128 |
| 4,324,195 | 4/1982 | Cunningham et al. . | |
| 4,487,153 | 12/1984 | McMahon et al. . | |
| 4,773,607 | * 9/1988 | Missout et al. | 242/361 X |
| 5,485,973 | * 1/1996 | Nellessen, Jr. | 242/386 |
| 5,551,545 | 9/1996 | Gelfman . | |

FOREIGN PATENT DOCUMENTS

| | | | |
|---|---|---|---|
| 161862 | * 8/1985 | (JP) | 242/362 |
| 3230479 | * 9/1988 | (JP) | 242/362 |
| 1043469 | * 2/1989 | (JP) | 242/362 |

* cited by examiner

Primary Examiner—William A. Rivera
(74) Attorney, Agent, or Firm—Garvey, Smith, Nehrbass & Doody, L.L.C.

(57) ABSTRACT

A method of ROV tether storage without the use of electrical rotary slip rings, and a tether storage drum. The heart of the Tether Storage System (TSS) invention involves the rotating beam with a powered tether sheave and guide plate on a circular track. The concept of a rotating beam with a powered tether sheave and beam drive motors in a single unit is uniquely different than any other tether storage and handling system. Rotating the sheave about the TSS frame's vertical axis is also unique. To accomplish this, preferably a drive motor is mounted at each end of the beam. A drive wheel on each motor reacts against the channel track to rotate the beam. Rollers at each end of the beam support and guide it. The tether is stored in a large circular basket below the sheave in the cylindrical frame. A guide plate attached to the sheave beam rests on top of the tether in the storage basket. This plate rotates with the beam and moves vertically to remain on top of the tether, to facilitate feeding on deployment and storage. The tether passes from the basket through the guide plate feed gap, to the tether sheave, then through the guide tube and docking assembly, from the TSS to the ROV. The tether path is simple and direct with a minimum of bending, tensioning, and twisting. The overall configuration is a cylindrical pipe frame that houses the rotating sheave beam unit, tether guide plate, storage basket, and other operating components. This system captures and deploys the ROV for launch and recovery from the surface to the working depth. A docking pin on top of the ROV mates with the TSS docking assembly to provide this control. The TSS extends the operational parameters for ROV submersibles by freeing it from surface effects, in column currents, and main umbilical drag.

8 Claims, 15 Drawing Sheets

TETHER STORAGE SYSTEM

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a subsea tether cable storage system for Remotely Operated Vehicles (ROV) and submersibles. More particularly, the present invention relates to a tether cable deployment, retrieval and storage system.

2. General Background of the Invention

A subsea Tether Storage System (TSS) is used to free the ROV submersible from the effects of surface sea conditions, in column currents and to facilitate vehicle tether handling and storage. To accomplish this, a high strength armored umbilical from the surface is secured to the TSS where it is connected to a smaller, lighter, more flexible and near neutrally buoyant cable (tether). This tether connects to the ROV to provide power, instrumentation and control from the surface through the armored umbilical without the weight and hindrance of the main umbilical. The ROV is initially deployed from the surface, mated and secured to the TSS as a single unit. The TSS is negatively ballasted to maintain tension on the umbilical for positioning and current bucking characteristics. Upon reaching a predetermined depth and location, the ROV is unmated and, under its own propulsion, proceeds to the work site to perform assigned tasks. Tether is deployed as needed to allow the ROV to traverse hundreds of feet. Sufficient slack is provided to prevent hindering the ROV and to eliminate adverse surface effects.

There are two basic types of submersible tether storage systems: the top hat, also known as the bottom entry, and the side entry cage or launcher. The top hat system secures on top of the ROV. Its configuration is generally cylindrical but can be rectangular in shape. In this type of system, the tether is stored on a reel or in a basket and is payed in and out from the bottom of the system at the ROV docking point. During deployment, the ROV is released from the system and swims downward and away to the work site under its own propulsion. The process is reversed for retrieval and docking. The second type of tether storage system, the side entry cage or launcher, is usually much larger and completely encloses and secures the ROV inside the system. In this case, the tether is stored on a powered reel. During deployment, the ROV is released and swims out of the system horizontally under its own propulsion. Again, the process is reversed for retrieval and docking.

There are tether storage systems which coil tether into a basket; however, they use bail arms and may not be able to take high line loads, such as would occur if the ROV loses power.

The following U.S. Patents are incorporated herein by reference:

U.S. Pat. No. 4,487,153
U.S. Pat. No. 3,715,068
U.S. Pat. No. 5,551,545.

BRIEF SUMMARY OF THE INVENTION

The Tether Storage System (TSS) of the present invention solves the problems confronted by ROV submersible tether cable handling and storage in a simple and straightforward manner. A cylindrically shaped TSS in a top hat configuration is used. This TSS unit eliminates the use of a rotary slip ring unit for transmission of electrical power and electronic data from the surface umbilical to the tether for power, instrumentation and control of the ROV. The invention accomplishes this by using fixed connections at the TSS and by handling the tether with a minimum amount of bending and twisting. A large round basket in the TSS facilitates tether storage while minimizing tether stress conditions. Elimination of a powered storage reel and a complex level wind reduces the bending, tension, compression, chafing, and twisting imposed on the tether. This results in lower stresses thus reduced wear and tear to increase tether reliability and life. Exclusion of the electrical slip ring assembly required by powered storage reels also increases reliability and greatly reduces costs.

BRIEF DESCRIPTION OF THE DRAWINGS VIEWS

For a further understanding of the nature, objective, and advantages of the present invention, reference should be made to the following detailed description, read in conjunction with the following drawings, wherein like references identify and denote like elements and wherein.

Figure 2:
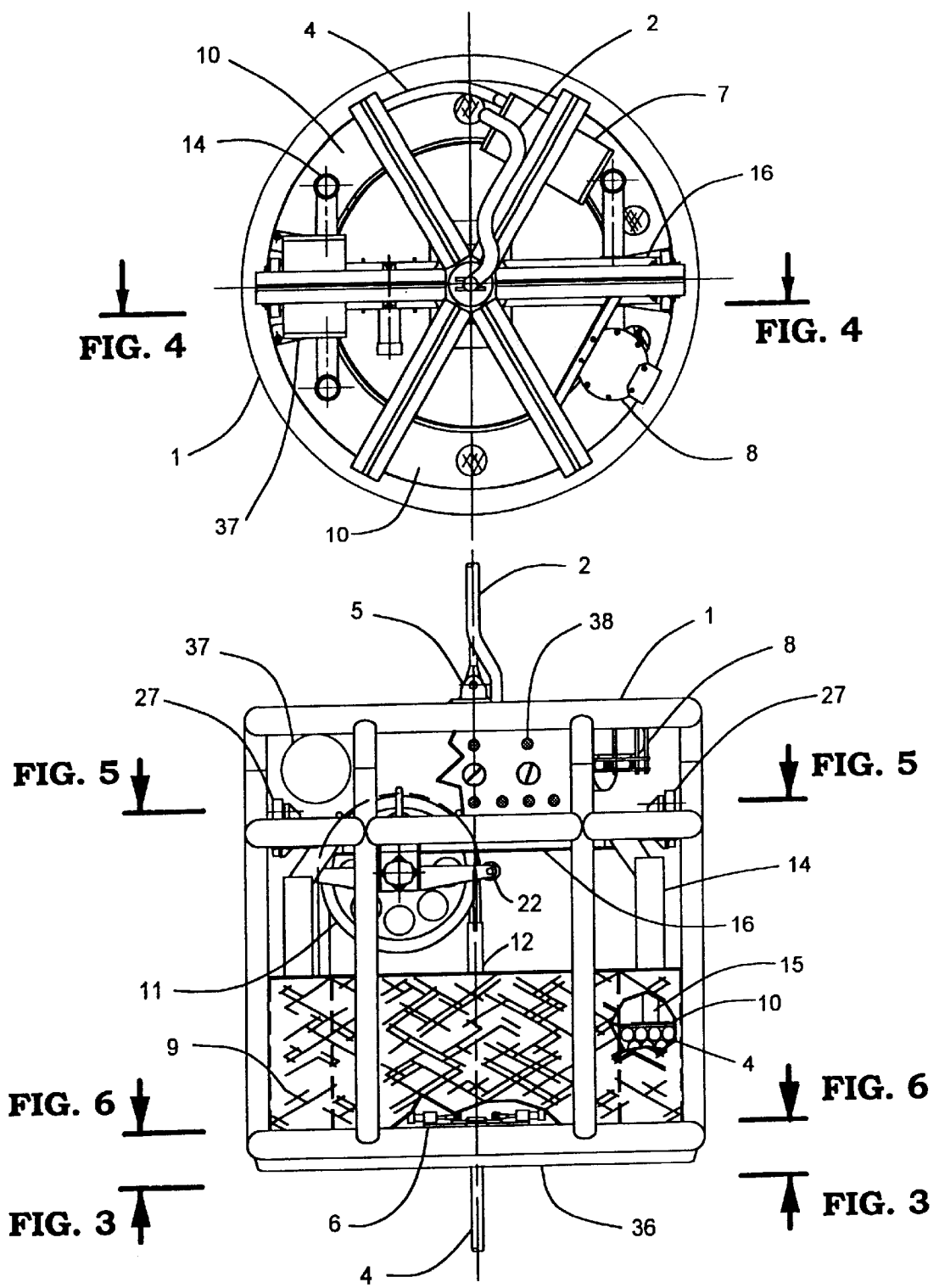
FIG. 2 shows the top and side views of the TSS invention. This figure locates the bottom view and cutaways, FIGS. 3, 4, 5 and 6, to provide a clearer understanding of how the device functions.
Figure 3:
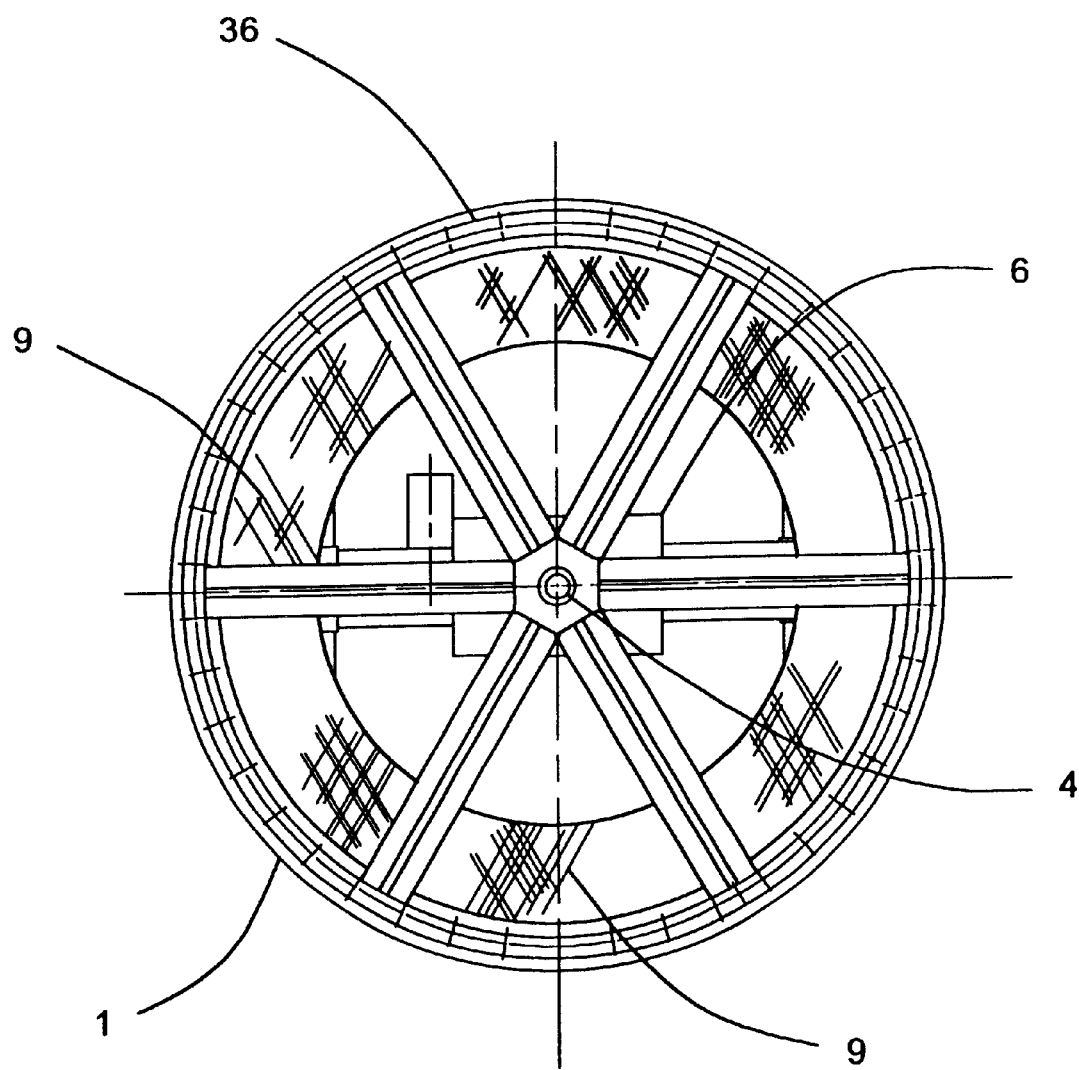
FIG. 3 is a bottom view located from FIG. 2 of the preferred TSS embodiment.
Figure 4:
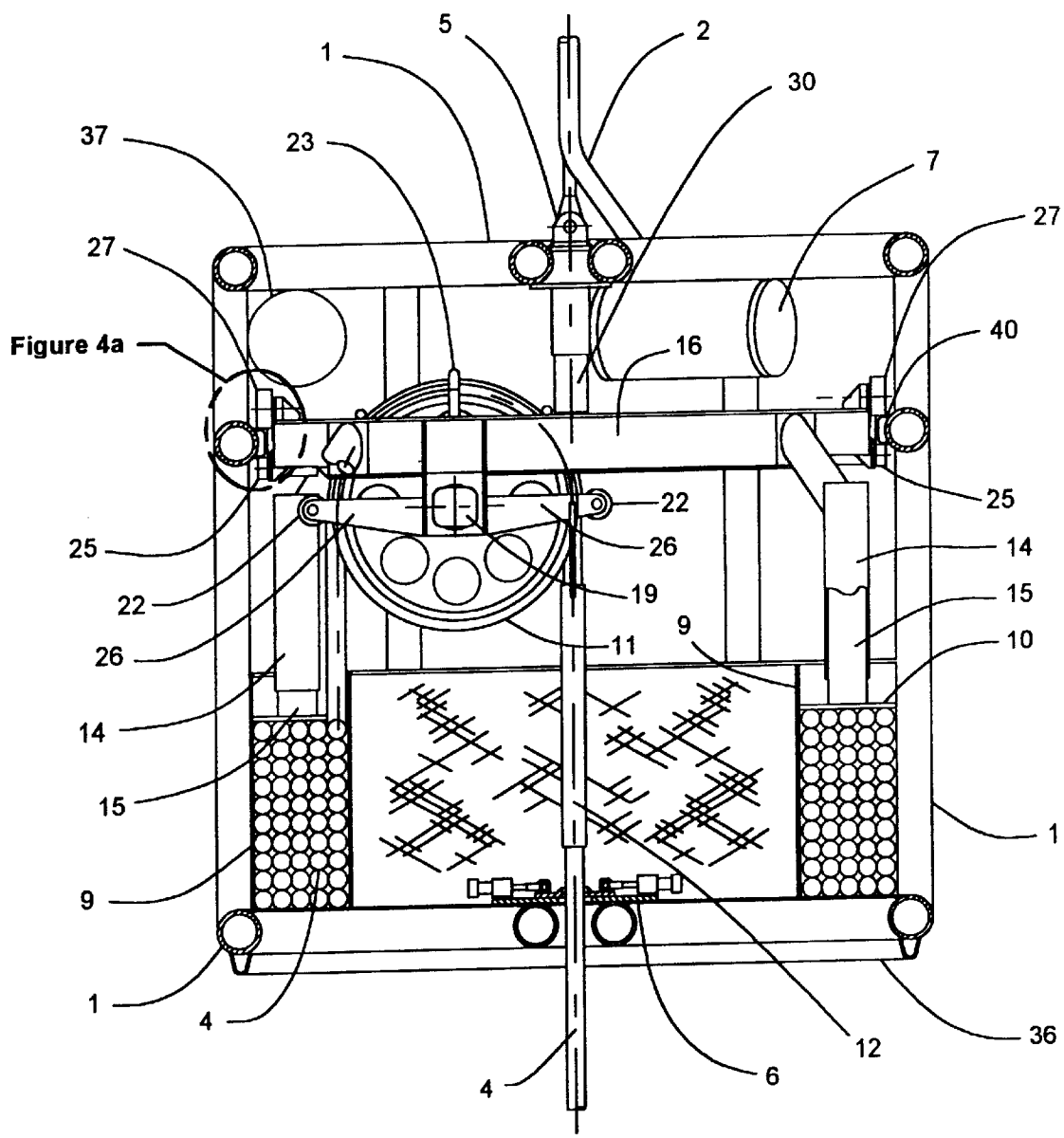

FIG. 4 is a vertical cutaway view located from FIG. 2 of the TSS. This is a complete cross section. Guide plate vertical telescoping legs are identified.

Figure 4A:
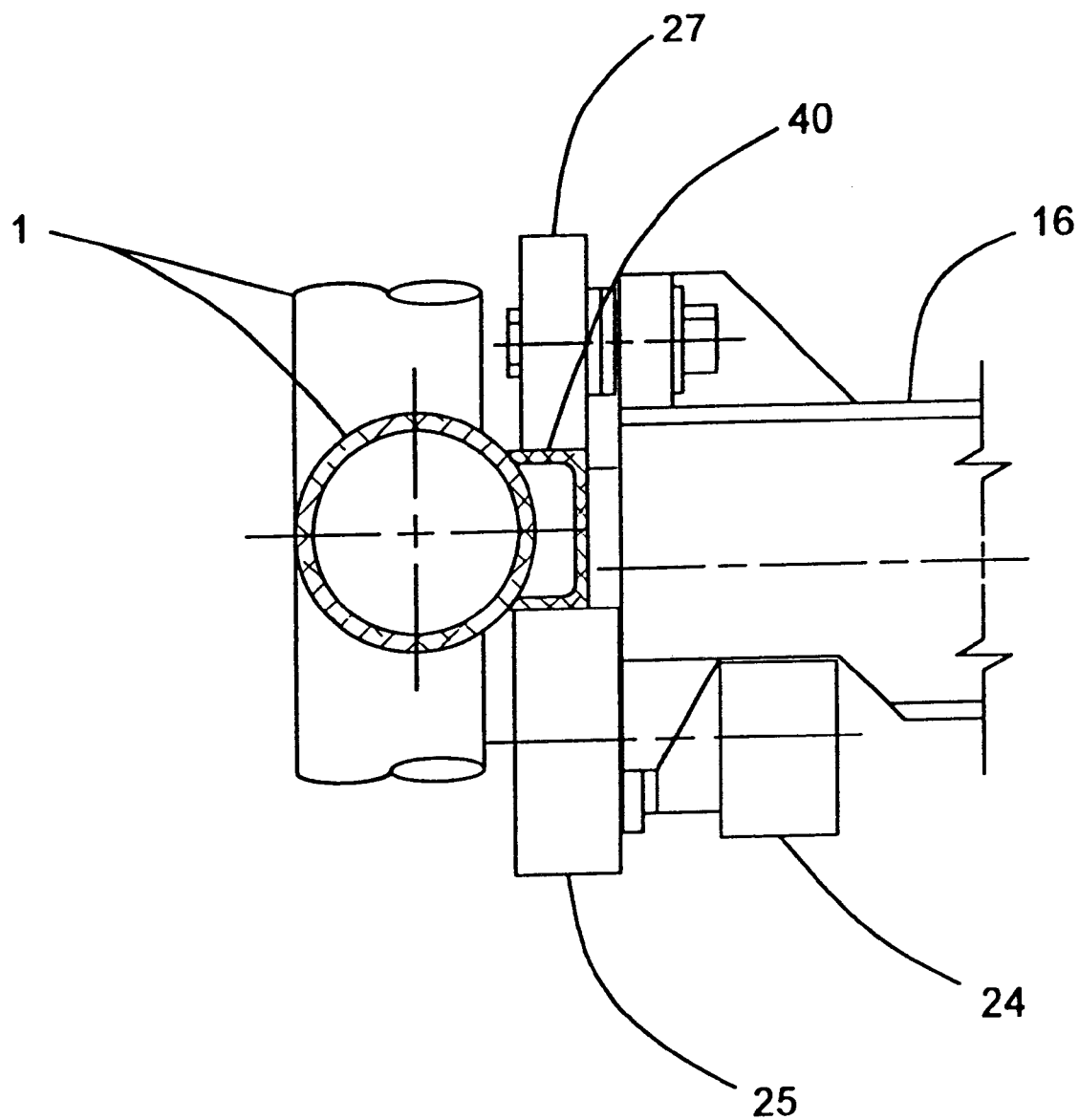

FIG. 4a is an enlargement of the sheave beam drive identified in FIG. 4.

Figure 5:
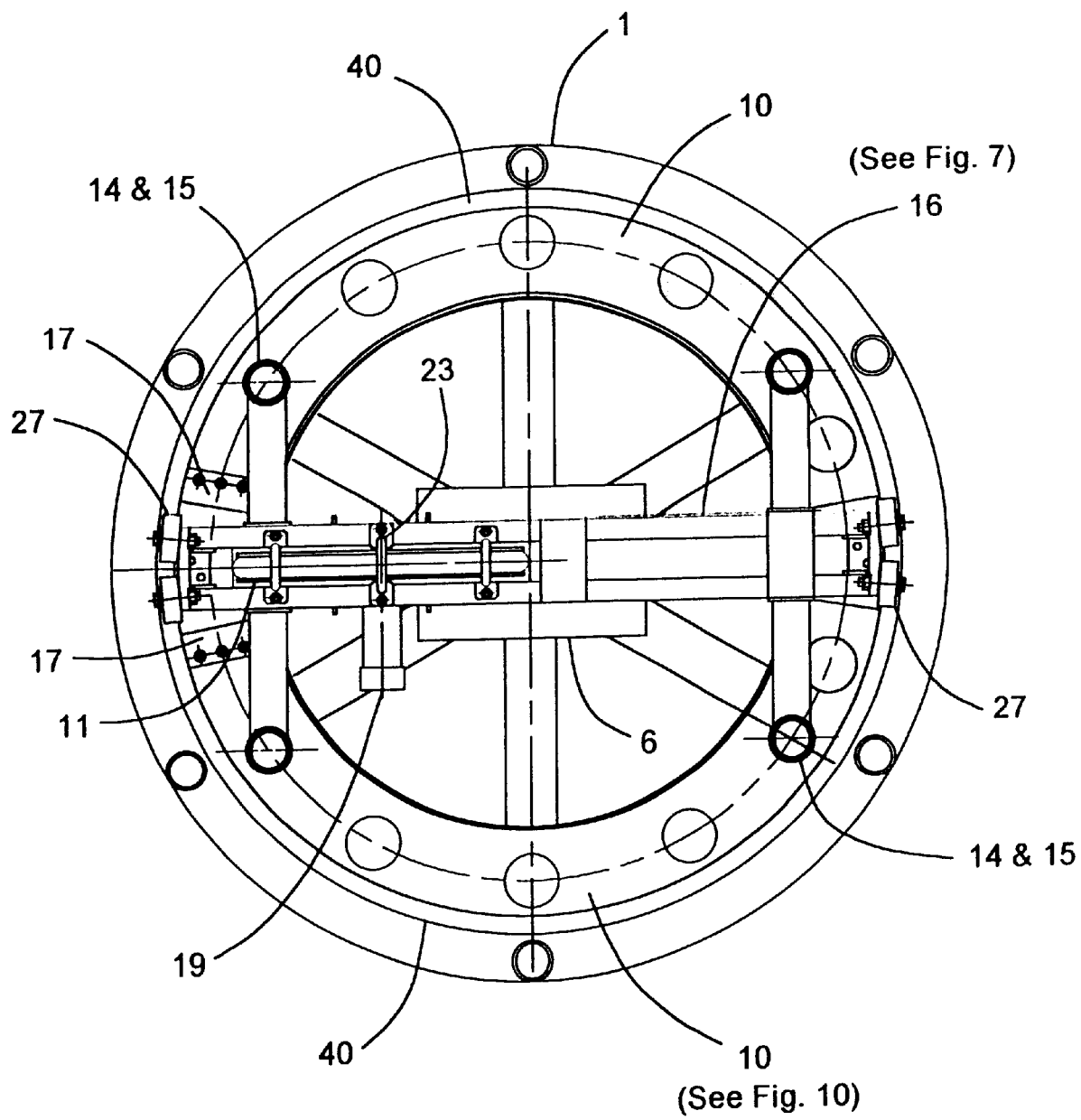
Figure 7:
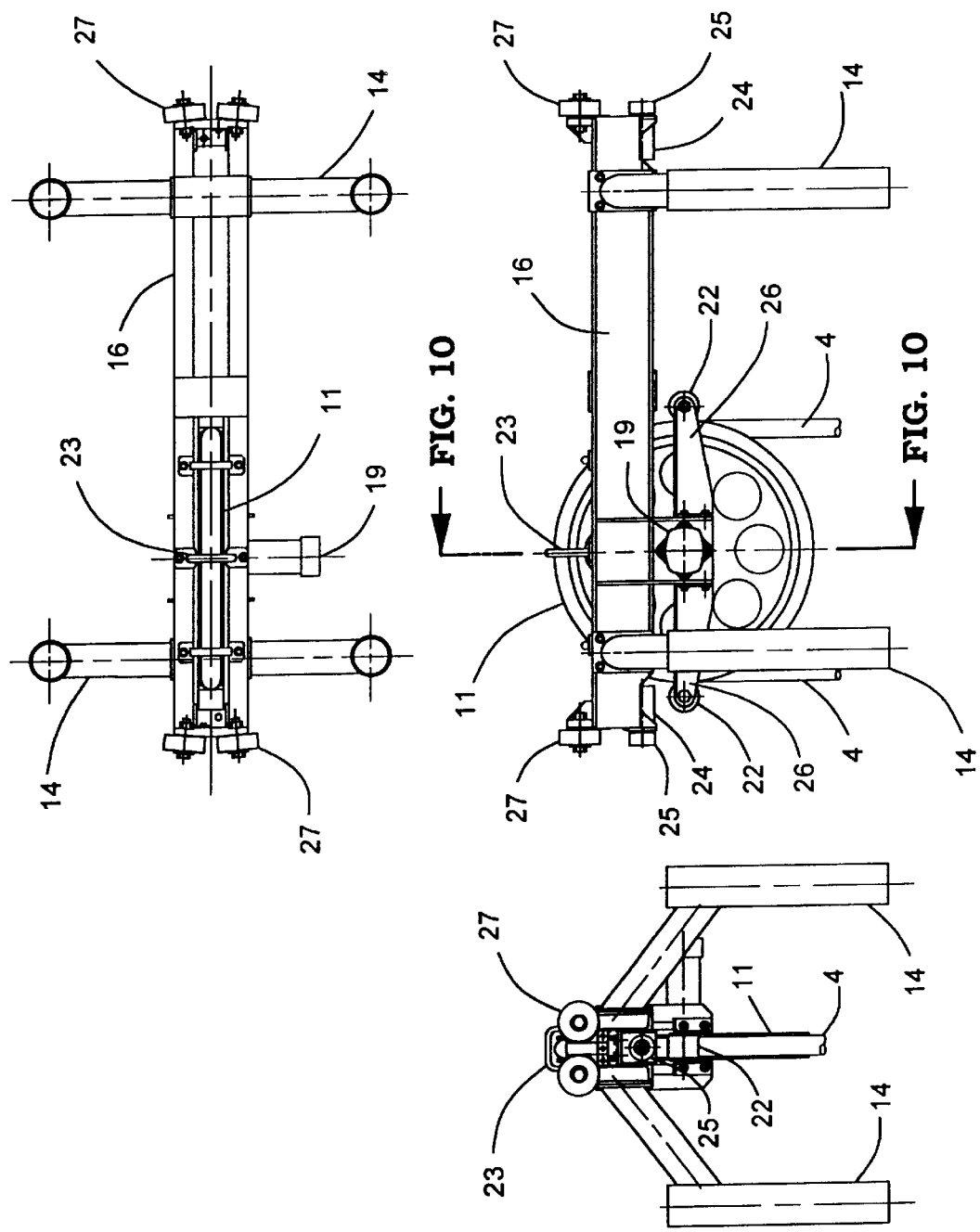

FIG. 5 is a cutaway view located from FIG. 2 of the rotating sheave beam. This view looks down on the sheave beam assembly to identify its components. FIG. 7 is referenced to give a clearer understanding of the sheave beam configuration.

Figure 6:
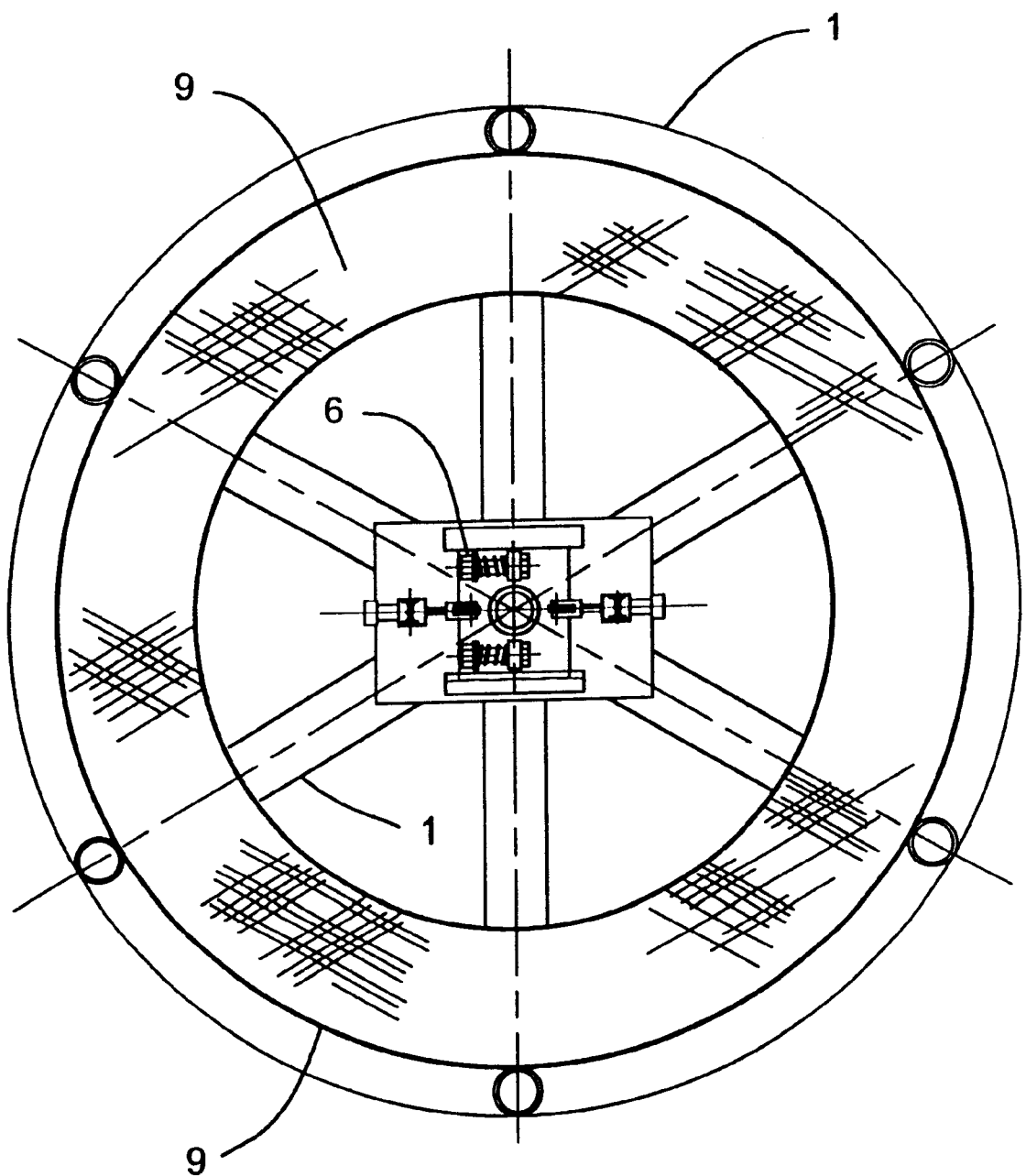

FIG. 6 is a cutaway view of the docking assembly and tether basket around it, located from FIG. 2 of the TSS.

FIG. 7 illustrates top, front and right side views of the rotating sheave beam assembly identified in FIG. 2 of the TSS. This figure further identifies components for clarity.

Figure 8:
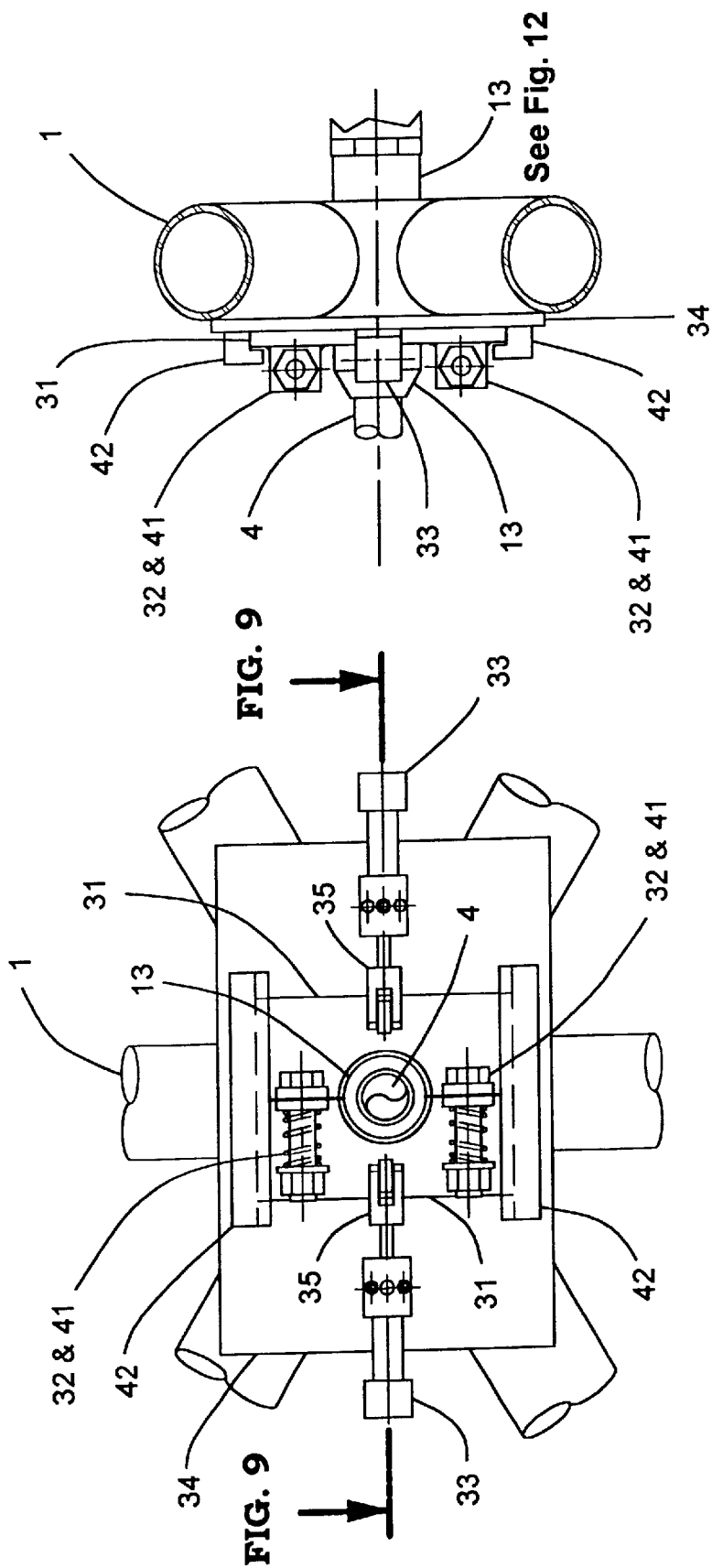

FIG. 8 is an enlargement showing details of the docking assembly located in FIG. 6 of the TSS.

Figure 9:
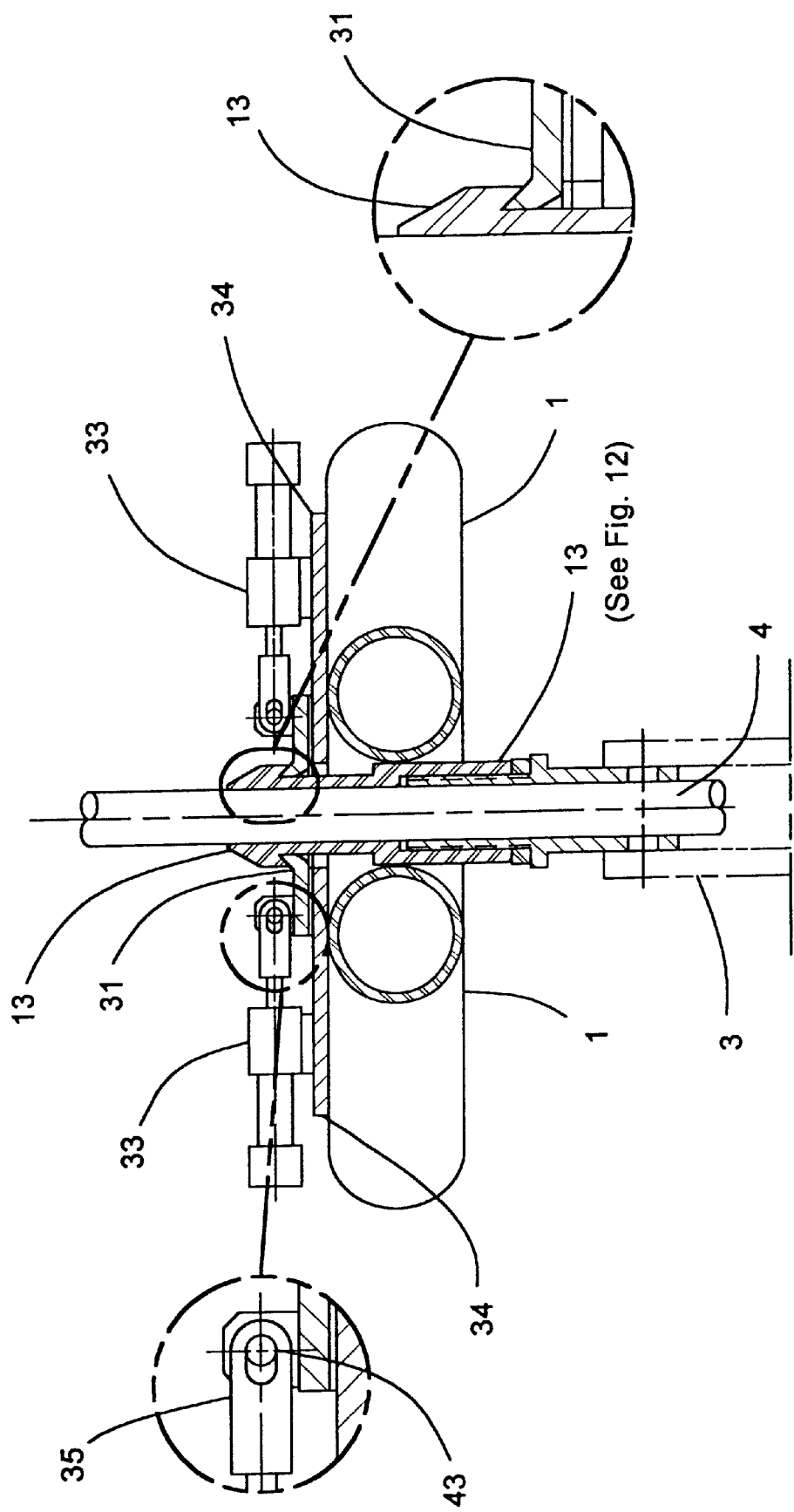

FIG. 9 is a cutaway view located from FIG. 8 of the docking assembly. In this illustration the ROV is docked secured by its docking pin. Two enlargements clarify interlocking and slotted clevis mate-up details.

Figure 10:
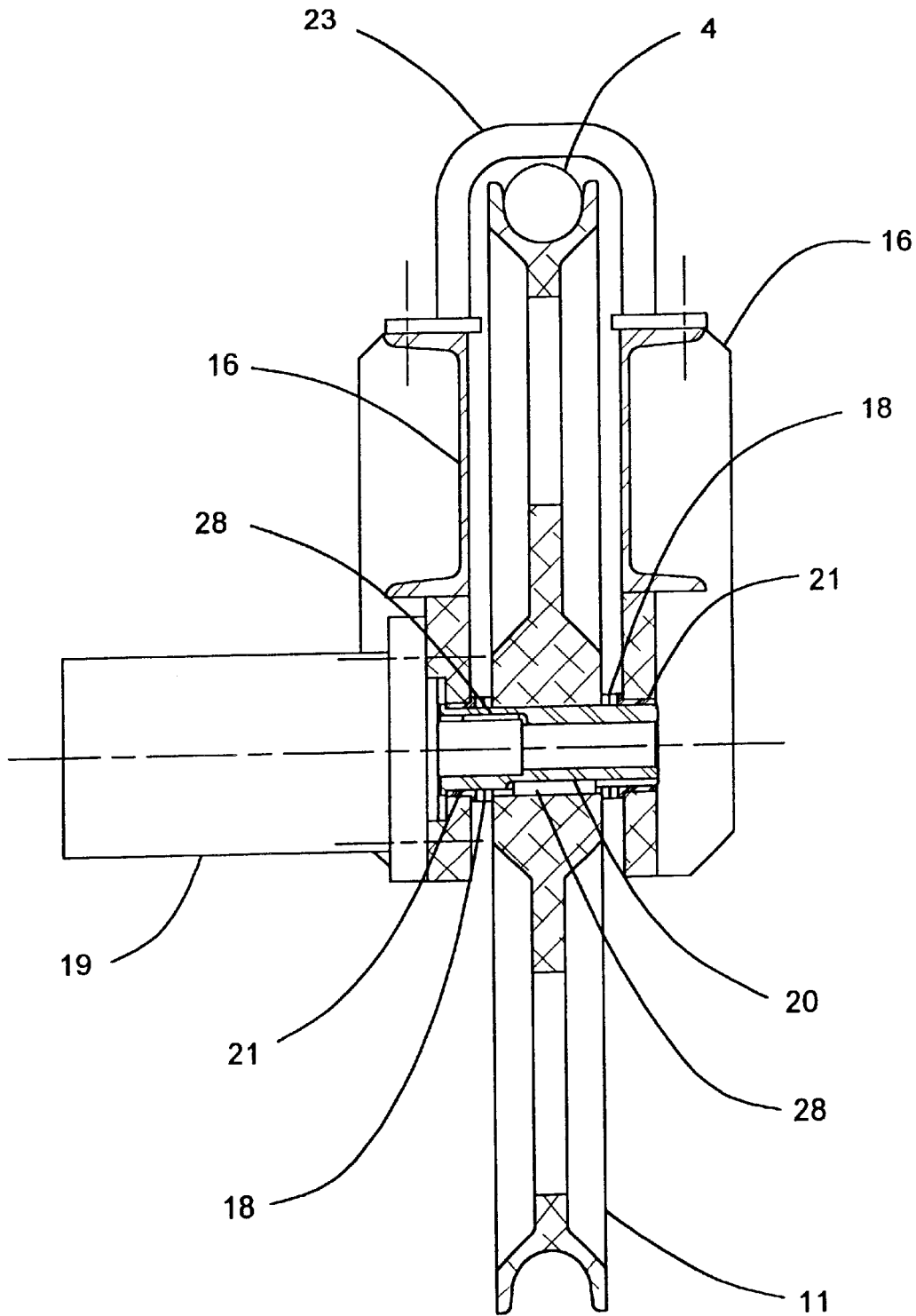

FIG. 10 is a cutaway located from FIG. 7. The tether, sheave beam, sheave shaft, bearings and drive motor details are shown.

Figure 11:
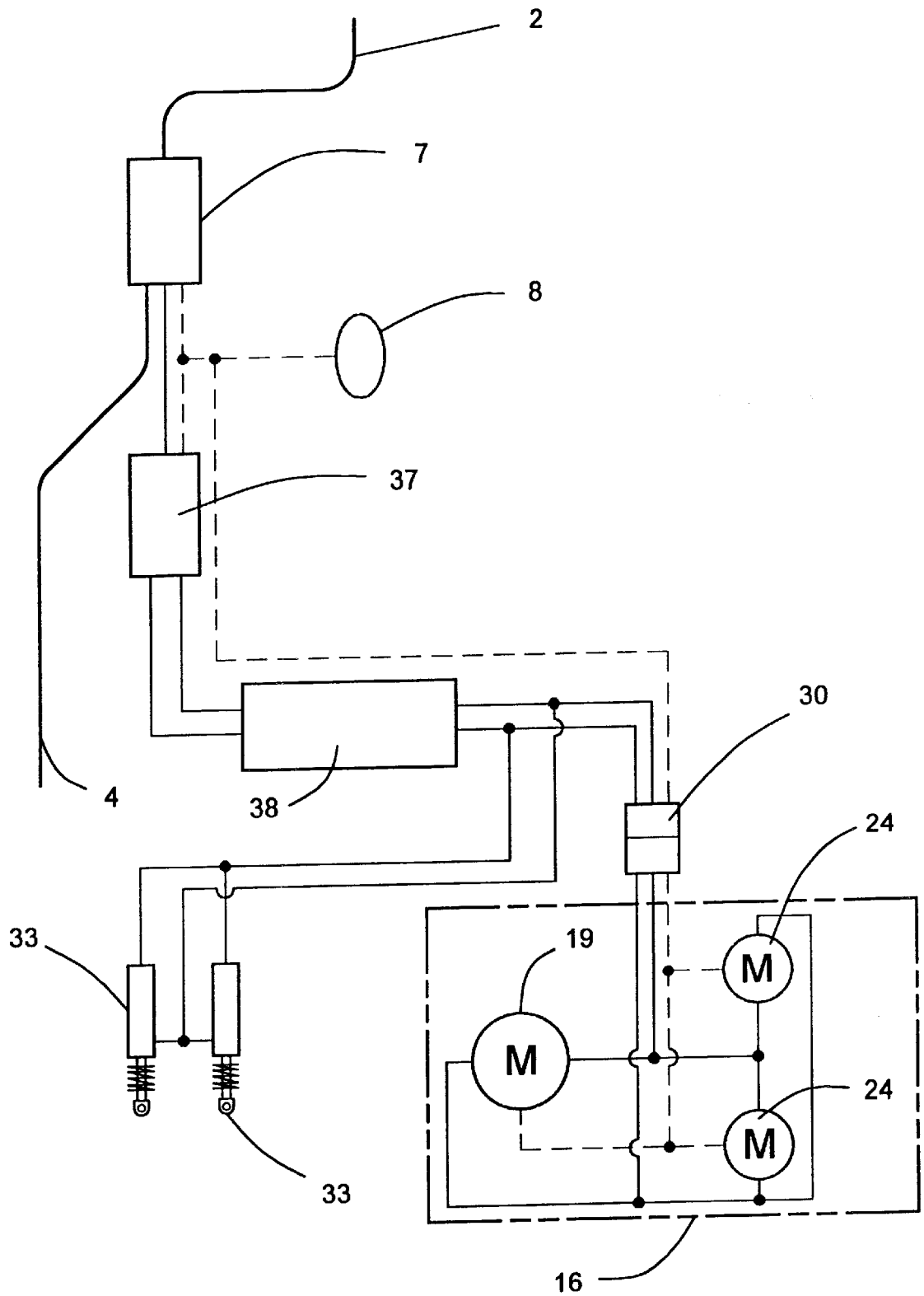

FIG. 11 is the hydraulic system's block diagram. It identifies TSS principal power components and their functions.

Figure 12:
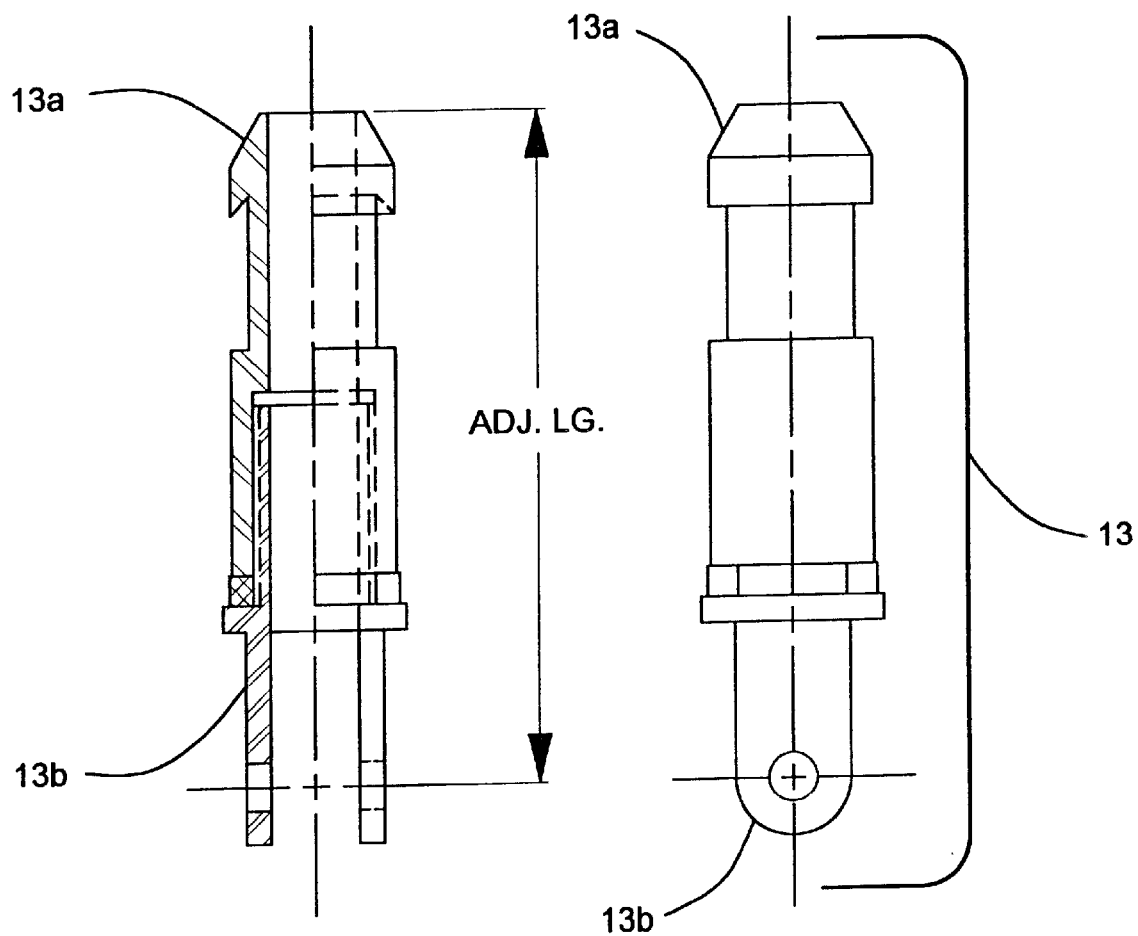

FIG. 12 is an illustration of the adjustable docking pin. This pin is mounted on top of the ROV and is used for mating and securing the ROV to the TSS.

Figure 13:
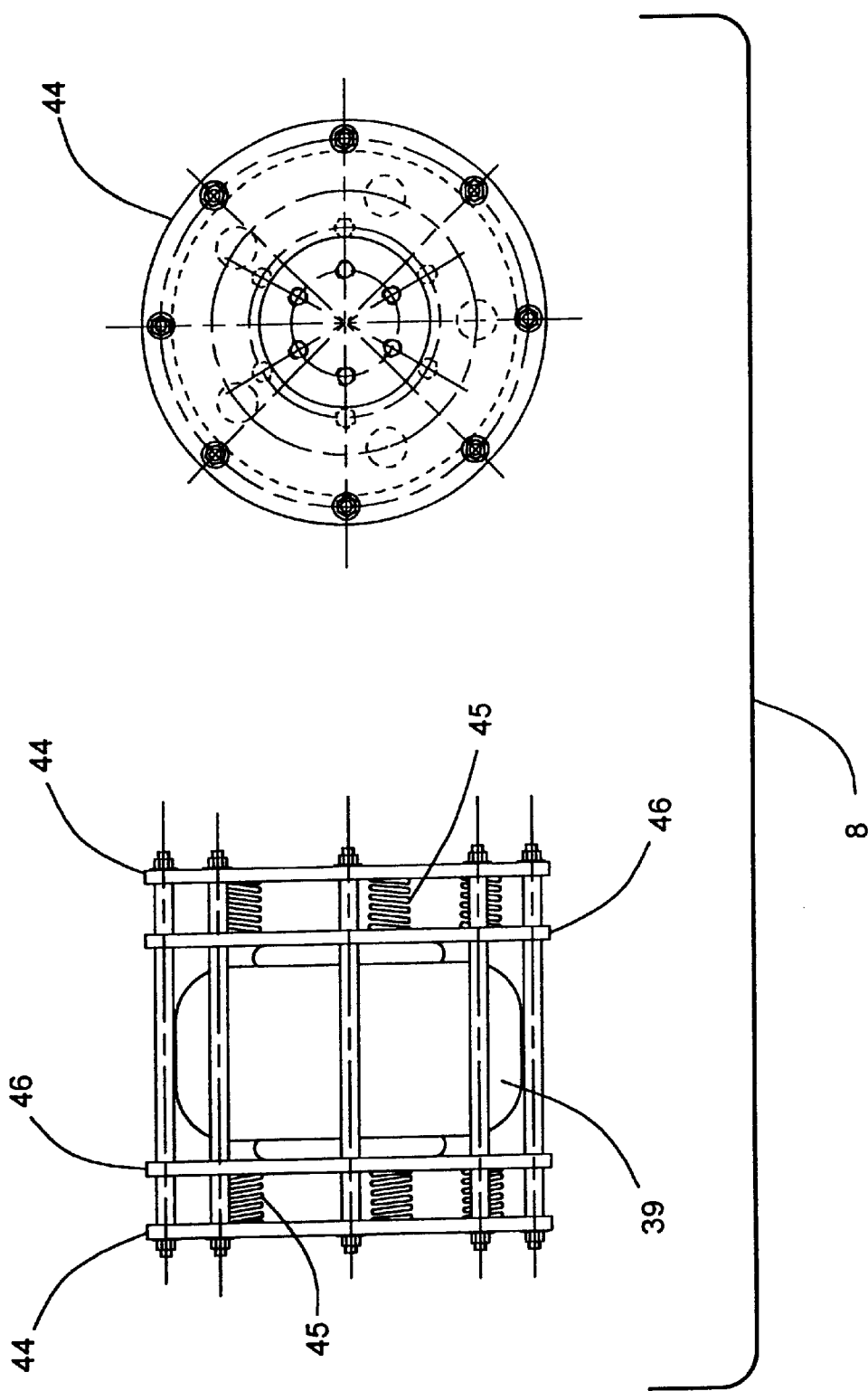

FIG. 13 is an illustration of the pressure compensator hydraulic reservoir unit.

Figure 14:
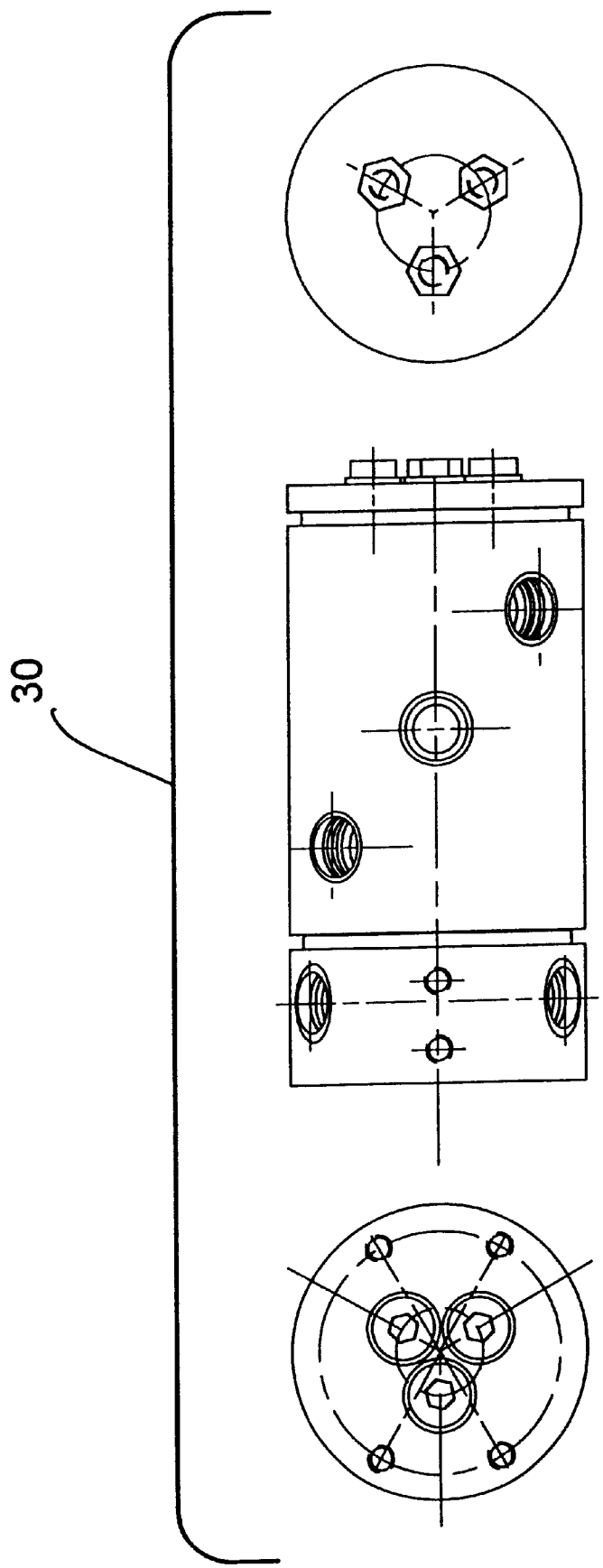

FIG. 14 is an illustration of the hydraulic rotary union.

DETAILED DESCRIPTION OF THE INVENTION

As a practical example of the invention's concept, the Tether Storage System (TSS) major components are illustrated, located and identified in the views, cutaways and diagrams provided in FIGS. 1 through 14. A general specification is also provided in Appendix "A" as an example of the TSS invention's parameters.

TSS General Arrangement

Figure 1:
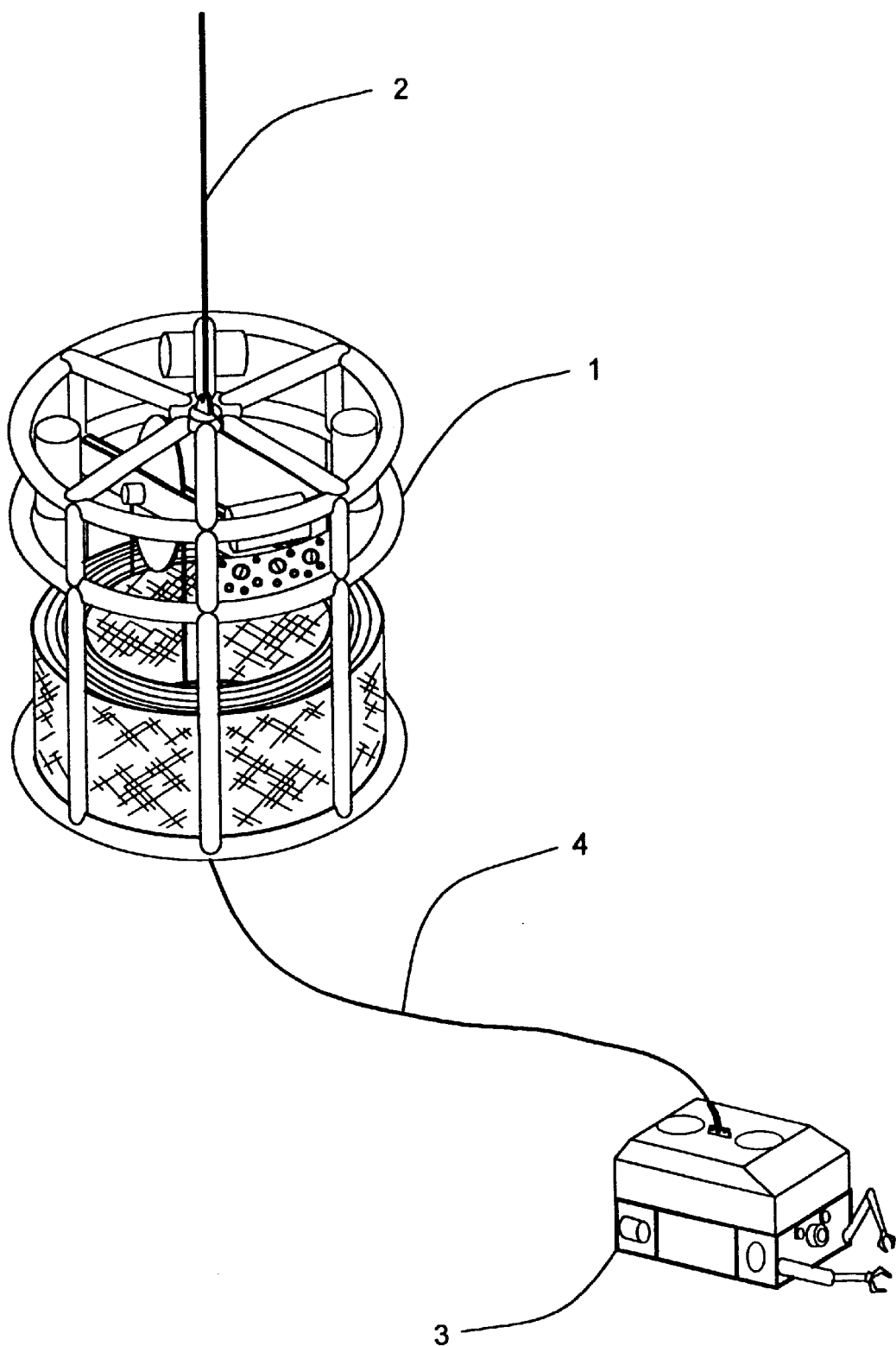
FIG. 1 is an overall illustration depicting the preferred embodiment of the TSS invention at depth with the tether and a ROV deployed.

FIG. 1 illustration shows the TSS 1 at depth, suspended from the surface by an armored main umbilical 2. This umbilical 2 provides electrical power and data for all instrumentation and control from the surface for the ROV 3 submersible through the TSS 1 and connecting cable (tether4). The TSS 1 is shown with the ROV 3 deployed via its tether 4 to provide continuity of a working system. The TSS 1 design stands apart from other tether storage systems because of the unique way the tether 4 is handled and stored without the use of electrical slip rings and a bailing arm device.

TSS Frame

FIG. 2 shows the side and top views of the TSS 1. The TSS frame is a structural cylindrical frame composed of corrosion resistant mechanical piping. The frame is designed to withstand the static and dynamic loads imposed by the ROV 3, tether 4, and an attached tool package during normal operating conditions. It is composed of a three-ring structure welded or otherwise secured to six preferably equally spaced vertical pipe members. The members align with six horizontal diagonals at each end, which weld to an inner center ring. These inner rings locate the lifting padeye 5 on top and the docking assembly 6 at the bottom. They also help establish the frame's vertical axis to guide the tether 4.

The top and side views in FIG. 2 show the main umbilical 2 secured to the lifting padeye 5 on top of the frame. Umbilical termination and connections to the termination module 7 are shown in the top view. Connections are made inside the oil filled, pressure compensated module 8. Appropriate electrical power, instrumentation and control circuits are made for the TSS 1 and ROV tether 4. All ROV 3 functions connect to the tether 4, and all TSS 1 functions are connected to the TSS 1. From the termination module 7 the tether 4 travels to the bottom of the frame and enters the basket 9 where it is coiled and stored. The basket 9 conforms to the cylindrical frame with its bottom and sides attached by welds. The top is open for the tether 4 and guide plate 10. The tether 4 (see FIGS. 2, 3 & 4) runs from the basket 9 through the guide plate 10 and over the sheave 11. It continues through the guide tube 12 and docking plate 6, then out of the bottom ring through the docking pin 13 to the ROV 3.

Guide Plate

Control of the tether 4 in the storage basket 9 is maintained by the guide plate 10, which fits inside the basket 9 on top of the tether 4 (see FIGS. 4 & 5). This plate 10 is configured in two semicircular half segments. Four pipe legs 15, two on each guide plate 10 segment, fit into mating beam guide 14 legs to allow the guide plate 10 to move vertically and rotate with the beam 16 as the tether 4 is fed (see FIGS. 4, 5 & 7). The weighted guide plate 10 on top of the tether 4 assists feeding the sheave 11 in paying in or out. The guide plate 10 also positions and controls the tether 4 to prevent entanglement. Rounded edging 17 located at the guide plate feed gap protects the tether 4 from chafing and damage as it passes through (see FIG. 5). The feed gap is located between the guide plate halves under the tether sheave 11. FIGS. 4 & 5 locate the guide plate feed gap, and position the four telescoping legs 15 of the guide plate 10. When paying in or out, the guide plate 10 follows the changing tether level to prevent entanglement in the basket 9. A positively buoyant tether 4 can become entangled without this plate.

Sheave Beam, Sheave & Tether Rollers

The sheave beam 16 (see FIGS. 7 & 10) for example, is composed of two back to back structural channels welded together with cross plates to form a box beam (see FIG. 10). Space between the channels is provided to mount the tether sheave 11 with thrust spacer washers 18. A mounting bracket is incorporated as part of the beam design for mounting the sheave 11, drive motor 19, sheave shaft 20, supporting bearings 21 and tether rollers 22. Three cross bar retainers 23 secured on top, over the sheave 11 retains the tether 4 (see FIGS. 4, 5, 7 & 10). A variable speed bidirectional hydraulic motor 19 powers the sheave 11. Minimum tether bend radius establishes sheave diameter. The sheave 11 also pivots about the vertical axis of the TSS 1 frame as the beam 16 rotates. Diametrically opposing tether rollers 22 hold the tether 4 against the sheave 11 to insure traction and line pull. These rollers 22 are mounted on brackets 26 bolted to the sheave beam-mounting bracket (see FIGS. 2, 4 & 7).

Power to rotate the sheave beam 16 is provided by a bi-directional, variable speed hydraulic motor drive 24 mounted preferably at each end. As an example, torque from the direct drive wheels 25 react against the underside of the channel track 40 to rotate the beam 16 (see FIGS. 4, 4a & 7). Two top rollers 27 at each end support the beam 16 and guide it on the circular channel track 40. Adjusting the load on each drive wheel 25 controls traction. This is accomplished by tightening the drive motor mounting bolts clamping the channel track 40 between the upper rollers 27 and the bottom drive wheel 25 (see FIG. 4a).

Sheave Shaft

Another unique feature is the sheave shaft 20 configuration (see FIG. 10). For ease of maintenance, this design facilitates drive motor 19 replacement without removal of the sheave 11. To accomplish this, a concentric double shaft design is used. The sheave motor shaft is inside the sheave shaft 20. The motor 19 is installed by aligning its shaft 20 with the sheave shaft and inserting it. Four mounting bolts secure the motor to the sheave beam mounting bracket 16. An internal motor key 28 and external sheave key 29 lock both shafts to the sheave 11 for transmission of torque to the sheave and tether. The sheave shaft 20 is supported at both ends in the beam with flanged bearings 21. These self-lubricating plain bearings are installed with the flanges inboard to retain them and provide thrust surfaces for the spacer washers 18 on each side of the sheave 11. Washers position and center the sheave 11 to resolve any side loads. A flange on the sheave shaft 20, at the drive motor end, prevents it from moving longitudinally.

FIG. 4 is a cutaway showing the tether's path from its stowed position in the basket 9 to the sheave 11, through the guide tube 12 and docking assembly 6, and out of the TSS 1. The TSS 1 bottom frame inner ring guides the tether 4 as it pays in and out to the ROV 3. This ring also guides the docking pin 13 up into the docking plate 31 during ROV 3 recovery and docking operations (see FIGS. 3, 6, 8 & 9).

Tether Guide Tube

Insufficient tether guidance can result in unnecessary damage. A tether guide tube 12 (see FIG. 4) is installed vertically from the sheave roller bracket 26 in line with the tether 4. It extends between the sheave 11 and docking plate 31 to insure tether 4 travel is smooth without bending or buckling. The guide tube 12 is sized larger than the tether 4 to allow it to pass freely through. Tube material can be plastic or aluminum, for example.

Docking Assembly & Docking Pin

The docking assembly 6 captures and secures the ROV 3 to the TSS 1 for launch and recovery. This is accomplished with spring loaded docking plates 31 securing the docking pin 13 mounted on top of the ROV. Hydraulic power is used to lift the ROV 3 off the docking plates 31 and separate them. Each docking plate 31 is held closed by heavy compression springs 32 shown in FIG. 8. A bolted assembly retains and guides each spring during operation. Force to separate the docking plates 31 is provided hydraulically by two small cylinders 33 mounted on the base plate 34. A special slotted rod end clevis 35 (see FIG. 9) on each cylinder 33 connects it to each docking plate 31.

During recovery the tether 4 is pulled in until the docking pin 13 enters the docking plates 31 as the ROV 3 contacts and compresses the TSS bottom bumper 36 (see FIG. 4). At this point the docking plates 31 begin to separate as the pin 13 moves up forcing the plates 31 apart. Slots in each rod clevis 35 (see FIG. 9) allow the plates 31 to separate, the springs 32 close them back to capture the pin 13 and secure the ROV 3. The weight of the ROV 3 on the docking pin 13 combined with the springs 32 prevents accidental separation. The conical male collar of the plate 31 nests inside the female collar of the docking pin 13a locking the plates 31 and pin 13 together.

To launch the ROV 3, the docking pin 13 must be lifted up to clear the conical taper (see FIG. 9) on the docking plates 31. Once clear, retracting both cylinders 33 separates the docking plates 31 and releases the pin 13. Hydraulic control is designed to separate the docking plates 31 on tether 4 payout and close the plates 31 when paying in. Guide rails 42 (see FIG. 8) on the base plate 34 align the sliding docking plates 31 to assure even parallel motion. The ROV 3 is now released and free to travel.

The docking pin 13 (see FIG. 12) is adjustable in length and is mounted to the ROV 3 padeye. It is designed to handle the submersible and tool package weight. A female threaded head 3a and mating male threaded body 3b facilitate pin length adjustment. This adjustable feature accommodates a variety of ROV 3 submersibles. The adjustability allows mate-up between the TSS 1 and ROV 3 to be made with one universal docking pin design. A female conical taper in the head 3a secures the ROV 3 to the TSS 1 when mated. This taper locks the docking plate's collar 31 (see FIG. 9) together to prevent plate separation. Weight of the ROV 3 on the pin 13 increases the closing force on the docking plates 31.

Hydraulic System

The TSS hydraulic system is a closed loop system, which operates at variable speeds in both directions. All motors 24 and 25 are bidirectional industry standard components. Motors 25 and 25 are pressure compensated and sized to meet speed and power requirements. Maximum system operating pressure is 3,000 PSIW (PSI Working) over ambient depth. Marine finishes and coatings are used for saltwater corrosion protection. Valves, gauges and other components are either of corrosion resistant materials or are coated for protection from the marine environment.

The TSS hydraulic system provides power to operate and control the TSS system. Electrical power for operation is supplied from the surface through the main armored umbilical 2. This power can vary for each ROV 3 and is dependent on the manufacturer's specification and how the system was configured for the operator. Currently, each ROV operator and manufacturer have their own requirements; many systems are custom built. Because of this no attempt has been made to identify specific hydraulic and control components since this will depend on individual system specifics. Standard components are selected and used that are compatible with each particular ROV system. Hydraulic circuits used match requirements of the existing support system for available power and control. A functional hydraulic block diagram (see FIG. 11) is presented to identify components and explain how the system functions to operate the TSS 1.

TSS Hydraulic System Function (see FIG. 11)

All electrical power is supplied from the main umbilical 2. The umbilical size, number and type of conductors help determine available system power and control limitations from topside, the surface system, to the ROV 3. We will not discuss this for the reasons previously mentioned. We will discuss in general terms sufficient to describe and explain the TSS hydraulic and control system.

The umbilical 2 from the surface terminates at the termination module 7 on the TSS 1. Power, control and instrumentation conductors are separated here for the TSS 1 and ROV 3 or submersible. Power conductors 7 from the termination module are connected to the hydraulic power unit motor, a unit 37 comprised of an electric motor and pump. This is the system's prime mover which provides hydraulic power for the sheave 11, sheave beam motors 24 and docking cylinders 33. Both the termination module 7 and hydraulic power unit 37 are oil filled and pressure compensated. Internal components are submerged in oil to protect them from seawater and provide thermal conduction for cooling. The oil used is electrically non-conductive.

Pressure Compensator Hydraulic Reservoir

The pressure compensator hydraulic reservoir unit 8 (see FIGS. 11 & 13) transfers ambient depth pressure directly to the hydraulic system. It insures that the hydraulic pump 37, and other components and motors 19 and 24, operate properly at depth. This oil filled bladder unit allows the system to equalize with depth to eliminate the effects of external pressure. For system protection, a pop-off relief valve is set to 10 PSI above ambient pressure to prevent seawater intrusion into the hydraulic system and critical components. It is also the system's reservoir, providing up to one gallon of reserve capacity. This unit is located at the highest point in the system to allow trapped air to be vented. A pressure equalization compensator eliminates heavy pressure housings and special components.

Hydraulic Control Panel

A hydraulic control panel 38 is installed between the two top rings of the TSS frame (see FIGS. 1, & 2). The panel 38 mounts control valves and pressure gauges at an easy-to-see location. This facilitates adjustments to the sheave 19 and sheave beam motors 24 for speed and torque. Other components mounted on the sheave beam 16 aid rotational control.

Hydraulic Rotary Union

Hydraulic power is supplied to the sheave beam through a multi-port rotating union 30 (see FIG. 14). This union 30 is mounted to a bracket over the sheave beam 16 on the TSS 1 frame. It is centered on the vertical axis directly over the rotating sheave beam 16. Hoses and tubing connect the union 30 to the sheave beam 16. The union 30 provides hydraulic supply fluid, return fluid and a case drain. All motor case drains connect to the pressure compensator 8. These lines provide power for the sheave motor 19, and two sheave beam motors 24.

Hydraulic Cylinders

Two hydraulic docking cylinders 33 installed in the docking assembly (see FIGS. 6, 8 & 9) actuate to release the docking pin 13 and ROV 3. These cylinders 33 retract to open the docking plate 31 when the tether 4 is paid out and extend to close the plate 31 when the tether 4 is paid in. A detailed description on the working of the docking system is given above.

Set out below is a correlation of part numbers and referenced elements

1. TSS Frame: This structure houses the tether storage mechanism, power system, tether, control and monitoring systems. Materials, aluminum or stainless steel pipe, channels, plates, angles and rods and expanded metal or composite sheeting.
2. Main Umbilical: A multi-conductor armored marine cable providing control, telemetry & power from the surface to the TSS and ROV tether.
3. ROV (Remotely Operated Vehicle): An unmanned submersible controlled and powered from the surface through a main umbilical.
4. Tether: A multi-conductor cable providing control, telemetry & power from the main umbilical to the ROV.
5. Lift Padeye: Top padeye on TSS for securing the main umbilical and lifting the TSS. Material, stainless steel or aluminum.
6. Docking Assembly: The unit, which secures and releases the ROV from the TSS. This unit mates with the docking pin. Materials, stainless steel and aluminum.
7. Termination Module: The watertight, pressure compensated container, housing the connections from the main umbilical to the tether and TSS. Materials, stainless steel or aluminum and rubber and plastic composites.
8. Pressure Compensator: The depth pressure equalization unit that houses the system's depth pressure equalizer, a soft bladder/reservoir unit. Springs are used to bias the bladder for a slight positive pressure over ambient. Materials, steel, stainless steel, composite rubber and plastic.
9. Basket: Is a cylindrical configuration of expanded sheet material secured to the TSS frame for storing the tether. Material, aluminum or plastic composite sheet.
10. Guide Plate: Semi-circular plates of sheet material on top of the tether, which assist in feeding and retaining the tether in the basket. Materials, aluminum, stainless steel, and plastic.
11. Sheave: The plastic and metal sheave that pays the tether in or out of the TSS. Materials, aluminum or stainless steel and composite plastic.
11. Guide Tube: The tube, which is aligned and mounted between the docking unit and sheave that contains and guides the tether preventing bucking and mis-feeding. Material, plastic or aluminum.
13. Docking Pin: Is the mating male device secured on the ROV, which inserts and locks the ROV and TSS together. The top segment 13*a*, screws into the bottom segment 13*b* to adjust the length at installation. Material, stainless steel.
14. Beam Guide Leg: Four parallel and vertical legs mounted on the sheave beam to align and guide corresponding plate guide legs for controlling the guide plates. Materials, aluminum pipe or tubing and plastic.
15. Plate Guide Leg: Four parallel, vertical legs, two on each guide plate, which telescope into mating beam guide legs providing vertical compliance as tether basket level changes. Materials, aluminum pipe or tubing and plastic.
16. Sheave Beam: The structural beam mounting the sheave/motor unit, beam drive and guide legs. Materials, aluminum, stainless steel, steel and plastic.
17. Rounded Edging/Rollers: The edging and rollers mounted to the guide plate to facilitate tether feeding and reduce friction. Materials, plastic, aluminum and stainless steel.
18. Thrust Washers: Washers to resolve side loads and friction. Material, bearing plastic.
19. Sheave Motor: Hydraulic motor powering sheave. Materials, steel alloys and composites.
20. Sheave Shaft: Shaft connecting sheave motor to sheave. Material, stainless steel.
21. Bearing: Two bearings mounted in the sheave beam that support the sheave shaft and sheave. Material, self-lubricating bearing plastic.
22. Tether Roller: Two rollers mounted 180° apart that preload the tether against the sheave to insure traction and line pull. Materials, bearing plastic and stainless steel.
23. Tether Retainer: The cross bar guards for retaining the tether on the sheave. Materials, aluminum and stainless steel.
24. Beam Motor: The drive motor at each end of the sheave beam for beam rotation. Materials, steel alloy and rubber and plastic composites.
25. Drive Wheel: The wheel on each beam motor to cause beam rotation. Material, plastic composites.
26. Roller Bracket: Two brackets on the sheave beam that position and hold the tether rollers 180° apart on the sheave. Materials, plastic and stainless steel.
27. Beam Roller: Four rollers, two supporting each end of the sheave beam on the channel track, to facilitate beam rotation. Materials, composite plastic and stainless steel.
28. Motor Key: The rectangular key that locks the sheave motor shaft and sheave shaft together to transmit power. Material, stainless steel.
29. Sheave Key: The rectangular key that locks the sheave shaft and sheave together to transmit power. Material, stainless steel.
30. Rotary Union: The multi-ported rotary union, which transmits hydraulic power to the sheave beam for rotation. Materials, stainless steel, brass, composite plastic and rubber.
31. Docking Plate: Unit at the TSS bottom that receives the docking pin to secure the ROV and TSS together. Materials, aluminum, stainless steel, composite plastic and rubber.

32 Compression Spring: Coil springs, which keep the docking plates closed, together, to secure the docking pin. Material, stainless steel.
33 Hydraulic Cylinder: The two hydraulic cylinders mounted on the docking plate to cause opening and closing for releasing and securing the docking pin. Materials, stainless steel, brass, composite rubber and plastic.
34 Base Plate: The mounting plate for the docking assembly. Material, aluminum or stainless steel.
35 Slotted Clevis: Hydraulic cylinder devises that connect the docking plates and cylinders together in the docking assembly. Material, stainless steel.
36 Bumper: The bottom circular bumper on the TSS for ROV docking and mate-up. Material, composite rubber.
37 Hydraulic Power Unit: The hydraulic power source for the TSS, which is mounted on the TSS frame in a watertight pressure compensated housing. Material steel, stainless steel, aluminum, composite rubber and plastic.
38 Hydraulic Control Panel: The panel on the TSS, mounting the control valves and gauges for the hydraulic system. Material, aluminum or stainless steel and plastic.
39 Bladder/Reservoir: This is the soft bladder and reservoir for the pressure compensator. It transmits ambient depth pressure to the hydraulic system. Material, composite rubber.
40 Circular Channel Track: The circular channel track in the TSS frame, which guides and supports the sheave beam. Material, aluminum or stainless steel.
41 Nut & Bolt Assembly: The bolt assembly that retains and guides the springs for the docking plates. Material, stainless steel
42 Guide Rail: The two guide rails for the docking plates on the base plate. Material, aluminum or stainless steel.
43 Clevis Pin: The pin, which locks the docking plates and hydraulic cylinders together. Material, stainless steel.
44 End Plates: Plates on the pressure compensator that retain the ends, bladder and springs. Materials, stainless steel or plastic.
45 Compensator Springs: Springs in the hydraulic pressure compensator which bias the bladder/reservoir, providing a slight positive pressure over ambient depth. Material, stainless steel.
46 Spring Plates: Plates that transmit compensator spring force to the bladder to bias the hydraulic system pressure over ambient depth pressure. Material, stainless steel or plastic.

PARTS LIST

The following is a list of parts and materials suitable for use in the present invention:

TSS Frame, PN TSS-101, Seamless 3" & 4", Schedule 80 Pipe, 6061-T6 Aluminum. Basket, Flattened Expanded Aluminum Sheet, Type 5005-H34, 1½-0.125", 1.00"×2.75".½" Plate, 6061-T651 Aluminum, Angle 2"×2"×5/16", 6061-T6 Aluminum.

Sheave Beam Assembly, PN TSS-200,6"×0.200" Channel, 6061-T6 Aluminum. ¼", 5/16", ¾" & 1" Plate, 6061-T651 Aluminum.

Tether Sheave, PN TSS-203A, 2½"×25" Dia, 6061-T651 Aluminum.

Beam Motor Brackets, PN TSS-204, 5/16" Plate, 316 Stainless Steel

Beam Rollers, 4" Dia. Polyurethane Wheel Stock, Mc Master-Carr PN 2292T65

Drive Wheels, 2.5" Dia. Polyurethane Wheel Stock, Mc Master-Carr PN 2292T49

Sheave Shaft, PN TSS-206, 2⅜" Dia. Round Stock, 17-4PH Stainless Steel

Sheave Shaft Bearings, PN TSS-207, 2½" Dia. UHMW Rod, Mc Master-Carr PN 8701K53

Sheave Rollers, PN TSS-208, 3" Dia. UHMW Rod, Mc Master-Carr PN 8701K55

Tether Guide Plate, PN TSS-209, ⅜" Plate, 6061-T6 Aluminum. 3", Schedule 40 Pipe, 6061-T6 Aluminum. 3" Dia. UHMW Rod, Mc Master-Carr PN 8701K55

Tether Retainers, PN TSS-210, ¾" Dia. Rod, 6061-T6 Aluminum. 5/16" Plate, 6061-T6 Aluminum Guide Legs, PN TSS-211, 3" & 3½" Schedule 40 Pipe, 6061-T6 Aluminum. 5/16" Plate, 6061-T651 Aluminum.

Docking Plate, PN TSS-301-1, 1" Plate, 17-4 PH Stainless Steel.

Guide Rails, PN TSS-301-2, 1¼"×1½" Rect. Bar Stock, 6061-T6511

1⅛" Hydraulic Cylinders, Single Action, Airoyal Model No. SPHP-318SM-ES 318 1⅛×1-BB-CB Clevis, PN TSS-305-1

Clevis Pin, PN TSS-305-2

Compression Springs, 0.187" wire, 1.460" O.D.×2.5" Lg. Lee Spring PN LHC-187R-1 MB 316SS.

Docking Assembly, PN TSS-300

6 Port Hydraulic Rotary, PN TSS-600

Pressure Compensator, PN TSS-500

The Tether Storage System (TSS) of the present invention provides a means for storing ROV submersible tether/cable without the use of electrical rotary slip rings and storage drum. The apparatus of the present invention for storing and handling ROV tether/cable preferably comprises a cylindrical tubular frame, a rotary sheave beam assembly, a circular channel track, a tether storage basket, and a tether guide plate system. The design of the present invention minimizes tether storage and handling stresses. The tether path is the most direct and least complicated for tether handling and storage. The simplistic design of the present invention uses a minimum number of parts to increase life, reliability, and minimum maintenance.

The present invention can carry additional payload (instruments, tools, power units, etc.) protected inside the TSS frame.

The present invention requires no electrical control wiring to the TSS. It utilizes the existing reversing three phase electrical power scheme to control tether pay in/out.

All materials used or intended to be used are salt water compatible, or protected unless indicated otherwise.

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. Apparatus for storing and handling cable comprising:
   a frame;
   a circular track mounted on the frame;
   a cable storage basket in the frame for receiving coiled cable;
   a rotary sheave beam assembly rotatable on the circular track for coiling cable and paying the cable into the storage basket and for paying the cable out of the storage basket;

first motor means for rotating the rotary sheave beam assembly and second motor means for rotating the rotary sheave beam assembly.

2. The apparatus of claim 1, further comprising a cable guide plate system for guiding the cable into and out of the basket.

3. The apparatus of claim 2, wherein the cable guide plate system includes semicircular plates, each telescoping upward and downward.

4. The apparatus of any preceding claim, wherein the cable is a tether for remotely operated vehicles.

5. Apparatus for storing and handling cable comprising:

a frame;

a circular track mounted on the frame;

a cable storage basket in the frame for receiving coiled cable;

a rotary sheave beam assembly rotatable on the circular track for coiling cable and paying the cable into the storage basket and for paying the cable out of the storage basket;

first motor means for rotating the rotary sheave beam assembly and second motor means for rotating the rotary sheave beam assembly; and a cable guide plate system for guiding the cable into and out of the basket.

6. The apparatus of claim 5, wherein the cable guide plate system includes semicircular plates, each telescoping upward and downward.

7. The apparatus of claim 6, wherein the cable is a tether for remotely operated vehicles.

8. The apparatus of claim 5, wherein the cable is a tether for remotely operated vehicles.

\* \* \* \* \*